UNITED STATES PATENT OFFICE.

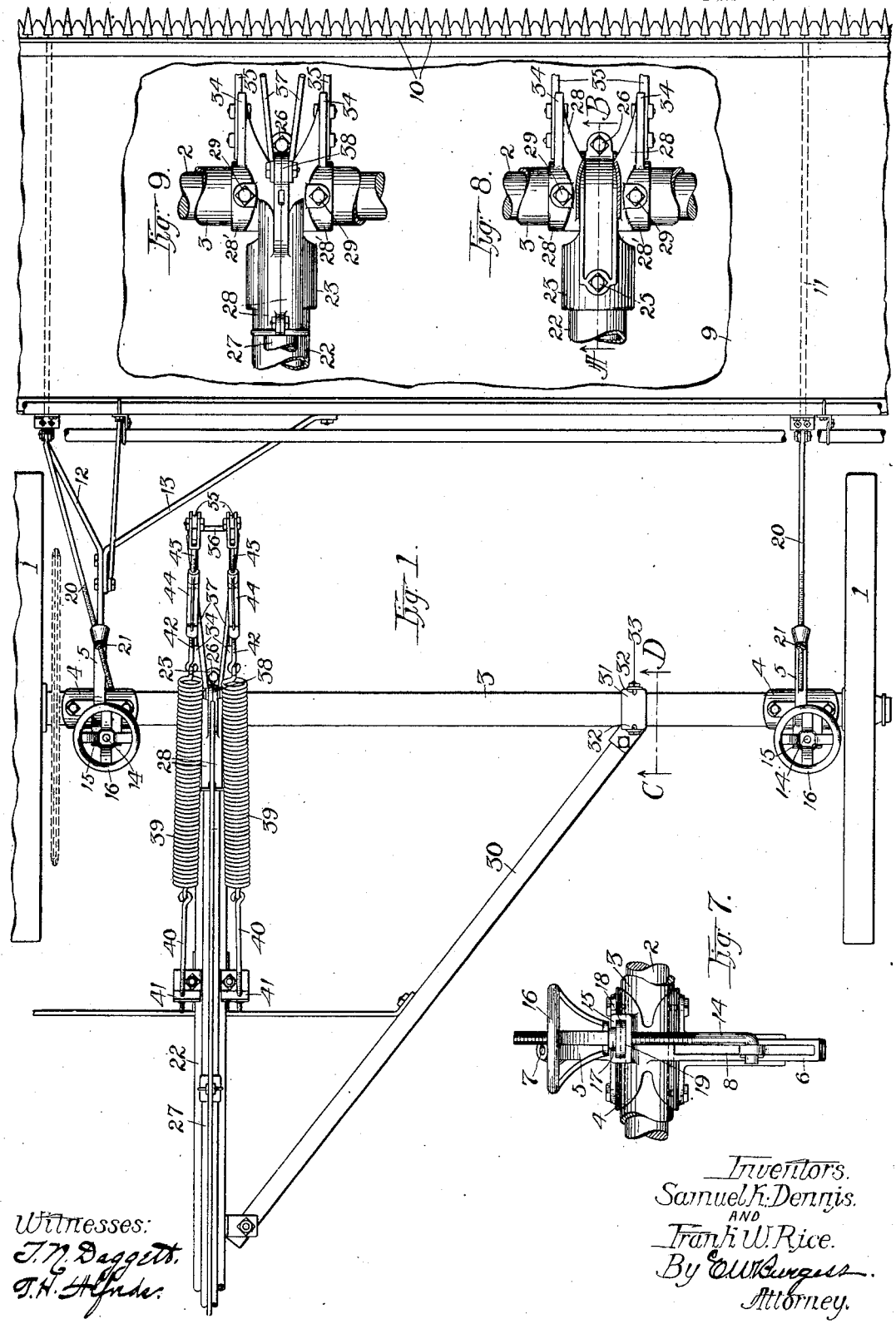

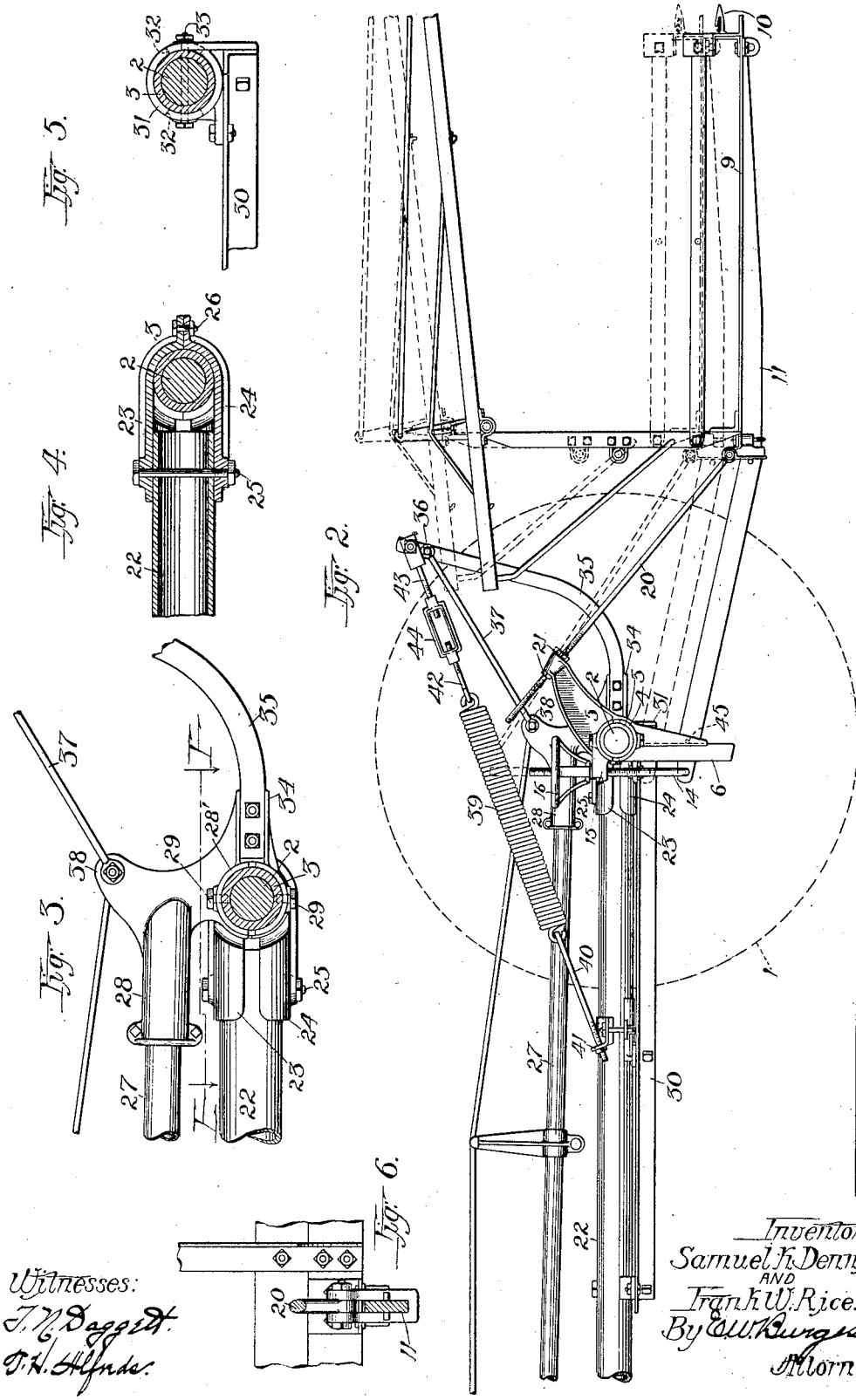

SAMUEL K. DENNIS AND FRANK W. RICE, OF CHICAGO, ILLINOIS, ASSIGNORS TO INTERNATIONAL HARVESTER COMPANY, A CORPORATION OF NEW JERSEY.

PLATFORM ADJUSTMENT FOR HARVESTERS.

No. 829,101.      Specification of Letters Patent.      Patented Aug. 21, 1906.

Application filed December 23, 1905. Serial No. 293,109.

*To all whom it may concern:*

Be it known that we, SAMUEL K. DENNIS and FRANK W. RICE, citizens of the United States, residing at Chicago, in the county of Cook and State of Illinois, have invented certain new and useful Improvements in Platform Adjustments for Harvesters, of which the following is a specification, reference being had to the accompanying drawings, forming a part thereof.

Our invention relates to harvesters having the grain-receiving platform and cutting mechanism in front of the supporting-wheels and pivotally mounted upon an axle connected therewith and having the forward end of what is commonly called a "push-pole" mounted upon the axle and connected therewith by means of suitable braces in a manner to form a suitable frame, to which the grain-platform is adjustably secured, the object of our invention being to provide improved means for adjusting the platform to a higher or lower plane and to maintain it in a position substantially horizontal in a fore-and-aft direction; and it consists in the devices illustrated by the drawings, in which—

Figure 1 represents a plan view of a part of a harvester of the type described embodying our invention. Fig. 2 is an end elevation of Fig. 1. Fig. 3 represents a detail showing the manner of connecting the push-pole with the axle. Fig. 4 is a section of the forward end of the push-pole and axle connecting means on a vertical central longitudinal plane relative to the pole on line A B of Fig. 8. Fig. 5 is a detached sectional detail on line C D of Fig. 1, showing the manner of connecting the forward end of the pole-brace to the axle. Fig. 6 is a sectional detail of the connection between the grain-platform and the supplemental sustaining-links. Fig. 7 is a detail, partly in section, of a part of the platform-adjusting devices. Fig. 8 is a sectional detail along line E F of Fig. 3, and Fig. 9 is a plan view of Fig. 3.

Similar reference characters represent similar parts throughout the several views.

Referring to the drawings, 1 represents the carrying-wheels journaled upon opposite ends of an axle 2, that is inclosed by a pipe 3. Secured to the pipe, near opposite ends thereof, are brackets 4, having upwardly and forwardly projecting arms 5 and depending arms 6, the arms 5 being provided with angularly-arranged openings 7 at their upper ends and the arms 6 with centrally and vertically arranged slots 8.

9 represents the grain-platform, having the cutting apparatus 10 at its forward side and the rearwardly-projecting frame-bars 11 and 12 at its rear side and the laterally-extending brace-bar 13 extending from near the middle portion of the bar 12 to the rear portion of the grain-platform, to which it is secured.

The rear ends of the frame-bars 11 and 12 are received by the slots 8, and projecting rearward therefrom are provided with lateral openings that receive the lower hooked ends of links 14, that are threaded at their upper ends, which pass through vertically-arranged openings in rearwardly-projecting ears 15 integral with the brackets 4, and hand-wheels 16 engage with the threaded portions of the links above the ears and operate as holding and adjusting means whereby the ends of the frame-bars are adjusted along the slots and retained in any desired position. The nut portions 17 of the hand-wheels are provided with enlarged flange portions 18 at their lower ends, that are received by internal grooves 19, formed in the ears 15 and adapted to hold the hand-wheels from displacement relative to the brackets, as shown in Fig. 7.

20 represents supplemental sustaining-links pivotally connected at their lower ends with the rear frame-piece of the grain-platform and having their upper threaded ends received by the angularly-arranged openings 7 in the bracket-arms 5, and 21 represents adjusting-nuts engaging the threaded portions of the links upon opposite sides of the arms and operating to secure the links in any desired position of adjustment for the purpose of adjusting the frame-bars 11 and 12 bodily in a vertical plane and maintaining the platform in a horizontal position in a fore-and-aft direction as it is raised or lowered, the openings 7 being formed with diverging walls for the purpose of allowing the links to swing therein, as shown by full and dotted lines in Fig. 2.

22 is a tubular push-pole pivotally mounted at its forward end upon the pipe 3 by means of a two-part connection comprising upper and lower parts 23 and 24, forming a rearwardly-projecting socket adapted to receive the pole and a laterally-disposed sleeve loosely embracing the pipe 3, the two parts being secured to the pole by means of the bolt 25 and to each other by means of the bolt 26, as shown in Fig. 4.

27 is a tubular tilting lever having its forward end provided with a two-part casting 28, secured thereto and having laterally and downwardly projecting arms provided with sleeve portions 28', adapted to inclose the pipe 3 upon opposite sides of the pole connection, and 29 are set-screws securing the sleeves to the pipe. The push-pole is braced laterally by means of the bar 30, having its rear end secured thereto and its forward end secured to sleeve 31, loosely mounted upon the pipe 3 and having circumferential slots 32 in the walls, and 33 is a bolt passing through the slots, pipe, and axle and operating to secure the sleeve against longitudinal movement along the pipe, but permitting a limited rotative movement thereon, as shown in Fig. 5. Projecting forward from the sleeve 28' of the two-part casting 28 are arm portions 34, to which are secured the rear ends of upwardly and forwardly curved bars 35, that are joined together near their upper ends by means of the cross-bar 36 and having rearwardly-extending braces 37 connecting their upper ends with upwardly-extending ears 38, integral with the parts 28.

39 represents counterbalancing springs upon opposite sides of the tilting lever and having their lower and rear ends connected with the push-pole by means of the links 40 and clips 41 and their upper and forward ends to the upturned ends of the curved bars 35 by means of the threaded links 42 and 43 and turnbuckles 44 in an adjustable manner, whereby the tension of the springs may be regulated. The tilting lever is made adjustable at its rear end in any of the well-known ways and operates to swing the grain-platform about its pivotal connection with the axle by rotating the pipe and said axle, the circumferential slots in the sleeve 31 allowing the pipe to turn therein, as before described. If it be desired to adjust the grain-platform to a higher or lower plane independent of the tilting mechanism, the operator manipulates the hand-wheels 16 in the desired direction, and by means of the nuts 21 the links 20 may be adjusted in either direction for the purpose of maintaining the platform in substantially a horizontal position in a fore-and-aft direction, and pins 45, passing laterally through the frame-bars 11 and 12 and abutting against the side walls of the slotted arms 6, operate to hold the platform against rearward movement relative thereto, and the flanged nuts forming part of the hand-wheels and engaging with the grooved ears prevent the frame-bars from being accidentally displaced.

What we claim as our invention, and desire to secure by Letters Patent, is—

1. In a grain-harvester, the combination of an axle, carrying-wheels mounted thereon, a pipe inclosing said axle and adapted to rock therewith, brackets rigidly secured to the pipe near opposite ends thereof, a grain-platform, rearwardly-projecting bars forming part of said grain-platform, adjustable connections between said bars and brackets, said connections wholly supporting said bars and permitting them to be adjusted bodily in vertical planes, a push-pole having its forward end loosely mounted upon said pipe, and means for rocking the pipe relative thereto.

2. In a grain-harvester, the combination of an axle, carrying-wheels mounted thereon, a pipe inclosing the axle and adapted to rock therewith, brackets secured to the pipe near opposite ends thereof, said brackets having depending arms provided with vertically-elongated slots extending therethrough from front to rear, a grain-platform having rearwardly-projecting frame-bars having their rear ends passing through the slots in said brackets, and means for adjusting them vertically therein, a push-pole having its forward end loosely mounted upon said pipe, and means for rocking the pipe relative thereto.

3. In a grain-harvester, the combination of an axle, carrying-wheels mounted thereon, a pipe inclosing the axle and adapted to rock therewith, brackets secured to the pipe near opposite ends thereof, said brackets having depending arms provided with vertically-elongated slots extending therethrough from front to rear and upwardly-extending arms having angularly-arranged openings therein, a grain-platform having rearwardly-projecting frame-bars having their rear ends passing through the slots in said brackets, and means for adjusting them vertically therein, links pivotally connected at their lower ends with the grain-platform and having their upper ends adjustably engaging the angularly-arranged openings in said upwardly-extending arms, a push-pole having its forward end loosely mounted upon said pipe, and means for rocking the pipe relative thereto.

4. In a grain-harvester, the combination of an axle, carrying-wheels mounted thereon, a pipe inclosing the axle and adapted to rock therewith, brackets secured to the pipe near opposite ends thereof, said brackets having rearwardly-projecting ears having vertically-arranged openings therein, said brackets having depending arms provided with vertically-elongated slots extending therethrough from front to rear, a grain-platform having rearwardly-projecting frame-bars having their rear ends passing through the slots in said brackets, links having their lower ends pivotally connected with the rear ends of said frame-bars and their upper ends threaded and passing through the vertical openings in said ears and having hand-wheels engaging with the threaded portion thereof in a manner to sustain the links in suspended position, a push-pole having its forward end loosely mounted upon said pipe, and means for rocking the pipe relative thereto.

5. In a grain-harvester, the combination of an axle, carrying-wheels mounted thereon, a pipe inclosing the axle and adapted to rock therewith, brackets secured to the pipe near opposite ends thereof, said brackets having rearwardly-projecting ears having vertically-arranged openings therein, and open-ended grooves upon opposite sides of said openings, said brackets having depending arms provided with vertically-elongated slots, extending therethrough from front to rear, a grain-platform having rearwardly-projecting frame-bars having their rear ends passing through the slots in said brackets, links having their lower ends pivotally connected with the rear ends of said frame-bars and their upper ends threaded and passing through the vertical openings in said ears and having hand-wheels engaging with the threaded portions thereof, said hand-wheels having flanges on their nut portions engaging with the grooves in said ears in a manner to prevent said wheels from being disengaged from said ears, a push-pole having its forward end loosely mounted upon said pipe, and means for rocking the pipe relative thereto.

6. In a grain-harvester, the combination of an axle, carrying-wheels mounted thereon, a pipe inclosing the axle and adapted to rock therewith, brackets secured to the pipe near opposite ends thereof, a grain-platform having rearwardly-projecting frame-bars adjustably suspended from said brackets, a push-pole provided at its forward end with a sleeve loosely inclosing the pipe, a tilting lever having a two-part casting secured to its forward end, said casting provided with laterally-arranged sleeves inclosing the pipe and secured thereto upon opposite sides of the push-pole connection therewith, and forwardly-projecting arms having forwardly and upwardly curved bars secured thereto, said bars having braces connecting their upper ends with the two-part casting, and a counterbalancing spring mechanism connecting the upper ends of said curved bars with the push-pole.

7. In a grain-harvester, the combination of an axle, carrying-wheels mounted thereon, a pipe inclosing the axle and adapted to rock therewith, brackets secured to the pipe near opposite ends thereof, a grain-platform having rearwardly-projecting frame-bars adjustably suspended from said brackets, a push-pole provided at its forward end with a sleeve loosely inclosing the pipe, a tilting lever having a two-part casting secured to its forward end, said casting provided with laterally-arranged sleeves inclosing the pipe and secured thereto upon opposite sides of the push-pole connection therewith, and forwardly-projecting arms having forwardly and upwardly curved bars, connected together at their upper ends by means of a cross-bar, braces extending from said upper ends to said two-part casting, and a counterbalancing spring mechanism comprising a pair of coiled springs, one upon each side of said tilting lever and having their opposite ends connected with the push-pole and the upper ends of said curved bars.

In witness whereof we hereto affix our signatures in presence of two witnesses.

SAMUEL K. DENNIS.
FRANK W. RICE.

Witnesses:
TINE N. DAGGETT.
T. H. ALFREDS.